United States Patent [19]

Takezawa et al.

[11] Patent Number: 5,234,967
[45] Date of Patent: Aug. 10, 1993

[54] RIGID FOAMED POLYURETHANE AND PROCESS FOR THE MANUFACTURE OF THE SAME

[75] Inventors: Minoru Takezawa, Ohta; Shigeo Yatsu, Tatebayashi; Fumihisa Endo, Ohta; Akihiro Morita, Ohragun; Yuji Kishi, Ohta, all of Japan

[73] Assignee: Sanyo Electric Co., Ltd., Osaka, Japan

[21] Appl. No.: 835,219

[22] Filed: Feb. 13, 1992

[30] Foreign Application Priority Data

Feb. 18, 1991 [JP] Japan .................................. 3-43953

[51] Int. Cl.$^5$ ............................................. C08G 18/14
[52] U.S. Cl. ..................................... 521/131; 521/155
[58] Field of Search .......................................... 521/131

[56] References Cited

U.S. PATENT DOCUMENTS 4,568,702 2/1986 Mascioli ............................. 521/129
4,636,529 1/1987 Crooken ............................. 521/131

Primary Examiner—Maurice J. Welsh
Attorney, Agent, or Firm—Darby & Darby

[57] ABSTRACT

According to the present invention, there is provided a rigid foamed polyurethane and a process for the manufacture of the polyurethane wherein the polyurethane is made up substantially of closed cells which contain at least a foaming agent designated by HCFC-22 and $CO_2$ gas therein. The foamed polyurethane can be obtained by using HCFC-22 or a blend of the HCFC-22 with HCFC-142b as foaming agent which has a short life in the atmosphere because of having hydrogen atoms in their molecules. Thus, according to the present invention, it is possible to avoid the use of conventional foaming agents which are suspected of being substances eating a hole in the atmospher's layer of ozone and consequently linking to global warming.

The rigid foamed polyurethanes of the present invention, which contain a foaming agent designated by HCFC-22 having a boiling point of $-40.8°$ C. in their closed cells, can retain their good thermal insulating properties over a temperature of from about $-30°$ to $-40°$ C., and can be used for most applications in the extremely cold conditions.

Further, when employing a HCFC-22 blend containing a specific amount of HCFC-142b as foaming agent, there is provided a rigid foamed polyurethane having a less change in thermal insulating properties on standing while retaining good flame resistance of the rigid foam.

5 Claims, No Drawings

RIGID FOAMED POLYURETHANE AND PROCESS FOR THE MANUFACTURE OF THE SAME

BACKGROUND OF THE INVENTION (1) Field of the Invention

In one aspect, this invention relates to a process for the manufacture of a rigid foamed polyurethane which does not use ozone-destroying cholorofluorocarbons (CFCs) as foaming agent. The CFCs also are believed to be so-called greenhouse gases. In another aspect, this invention related to the rigid foamed polyurethane manufactured by use of chlorodifluoromethane, $CHClF_2$ (designated by HCFC-22) and chlorodifluoroethane, $CH_3CClF_2$ (designated by HCFC-142b) as foaming agent which have no environmental problems because of the presence of hydrogen atoms in the molecules and the short life in the atmosphere.

The rigid foamed polyurethane of the present invention can retain its good insulating properties over a temperature of from about $-30°$ to $-40°$ C., and has less impairment in its thermal conductivity on standing while retaining its good flame resistance.

(2) Description of the Prior Art

It is known that rigid foamed polyurethanes made up substantially of closed cells, which are manufactured by use of a polyol, an isocyanate, water, $CCl_3F$ (designated by CFC-11) as foaming agent, have good mechanical and thermal insulating properties, excellent dimensional stability, sound insulating and electrical properties, and chemical resistance. Accordingly, they are widely used in the making of thermal insulating materials for refrigerators, freezers, chill cars, iceboxes, containers for frozen food, LPG tanks; insulating materials for panels of curtain walls; building materials for roofing or canopies of cold storage warehouses; and various parts of automobiles.

Lowland of University of California disclosed a theory in 1974 that specific CFCs which include dichlorofluoromethane (CFC-11), dichlorodifluoromethane (designated by CFC-12), trichlorotrifluoroethane (designated by CFC-113), dichlorotetrafluoroethane (designated by CFC-114) and chloropentafluoroethane (designated by CFC-115), are suspected of being ozone-destroying substances. The CFCs have been linked to the cause of an Antarctic hole in the Earth's ozone layer, which screens skin cancer-causing ultraviolet radiation from the sun.

Further, the CFCs are said to have a long-life, for example, for about 100 years in the environment and they absorb infrared light. Therefore, the CFCs also are believed to be so-called greenhouse gases; substances that may contribute to global warming that could cause the earth's temperature to rise with potentially catastrophic effects for health and production of crops.

Their use is strictly regulated in technological advanced countries and tightened still further.

Their use and production have been regulated in Japan since 1989, and a complete ban on the CFCs production and use will be in effect in the near future. From this point of view, it is an urgent matter to develop substitutes for the CFCs.

CFC-11, which is included in the specific CFCs and used widely in making foamed plastics as foaming agent, is similarly circumstanced. The CFC-11 has a boiling point of 23.8° C., and it liquefies in the closed cells of polyurethane when the polyurethane is used in making thermal insulating materials for refrigerators, freezers, or show cases which are maintained at about $-30°$ to $-40°$ C. In this case, the thermal conductivity of the insulating material changes sharply, yielding no effectual thermal insulating results.

Therefore, there is a need for developing a process for the manufacture of a rigid foamed polyurethane by use of a foaming agent which does not liquefy under such cold conditions and makes the foamed polyurethane retain its low thermal conductivity.

SUMMARY OF THE INVENTION

An object of the present invention is to provide a rigid foamed polyurethane and a process for the manufacture of the polyurethane, wherein the process comprises using a foaming agent which does not cause the above-described troubles. More particularly, an object of the present invention is to provide a rigid foamed polyurethane and a process for the manufacture of the polyurethane, wherein the process comprises using HCFC-22 as foaming agent which has a boiling point of $-40.8°$ C. and does not liquefy under a temperature of about $-30°$ to $-40°$ C.

A further object of the present invention is to provide a rigid foamed polyurethane and a process for the manufacture of the polyurethane, wherein the process comprises using an incombustible HCFC-22 blend containing a specific amount of combustible HCFC-142b therein by which an impairment in the thermal conductivity of the polyurethane on standing may be prevented while retaining the nonflammability of the blend.

DETAILED DESCRIPTION OF THE INVENTION

According to the first aspect of the invention, there is provided a rigid foamed polyurethane made up substantially of cells which contain at least HCFC-22 and $CO_2$ gas therein.

This polyurethane is manufactured by use of raw materials such as a polyol, an isocyanate, water, and HCFC-22 as foaming agent. The polyurethane is made up substantially of closed cells which are homogeneously distributed with no froth voids. Therefore, the foamed polyurethane obtained by the present invention has good mechanical, sound insulating and electrical properties, good dimensional stability, and chemical and flame resistance. It must be emphasized that the foamed polyurethane of the invention is made up substantially of closed cells which contain HCFC-22 and $CO_2$ gas therein, and has good thermal insulating properties in cold circumstances over a temperature of $-30°0$ to $-40°$ C. Thus, the insulating materials made from the foamed polyurethane are suitable for use in making refrigerators for household or industrial use, freezers, cold-storage cars, iceboxes, containers for frozen food, and the like.

The HCFC-22 employed in the invention has only a small value of ODP (Ozone Depletion Potential; an estimated value per unit mass for ozone-destroying power, based on CFC-11=1) of 0.05, and GHP (Greenhouse Potential; an estimated value per unit mass for greenhouse effect, based on CFC-12, i.e. $CCl_2F_2 = 1$) of 0.07.

The innoxious HCFC-22 is now available commercially as a main raw material of tetrafluoroethylene which is the monomer of polytetrafluoroethylene.

According to a second aspect of the invention, there is provided a rigid foamed polyurethane, the polyurethane being made up substantially of closed cells which contain HCFC-142b, in addition to HCFC-22 and $CO_2$ gas, in an amount of about 40 to 60% by weight based on the total weight of the HCFC-22 and HCFC-142b.

The innoxious HCFC-142b which is used in combination with HCFC-22 in the present invention has a boiling point of $-9.2$, an ODP value of less than 0.05, and a GHP value of less than 0.2, these values being less than the corresponding values for HCFC-22.

Further, the gas permeability of the HCFC-142b present in the closed cells is lower than that of HCFC-22.

However, the sole use of HCFC-142b is faced with problem of its flammability.

Thus, the applicant has discovered a novel foaming agent blend suitable for use in the manufacture of the polyurethane of the present invention, which blend consists essentially of about 40 to 60% by weight of HCFC-142b and about 60 to 40% by weight of HCFC-22. In this case, the blend may still retain its nonflammability. Moreover, the use of the foaming agent blend may prevent the impairment in the thermal insulating properties of the polyurethane on standing. By contrast, the sole use of HCFC-22 rapidly impairs the thermal insulating properties on standing, because of the high gas permeability of the HCFC-22.

When HCFC-142b is blended in an amount of 60% by weight or more based on the total weight of HCFC-22 and HCFC-142b, the blend becomes flammable unpreferably. When HCFC-142b is blended in an amount of 40% by weight or less, the preventing effect for the impairment in the insulating properties of the product on standing is insufficient unpreferably.

According to a third aspect of the invention, there is provided a process for the manufacture of the rigid foamed polyurethane by use at least of a polyol, an isocyanate, water, and HCFC-22, wherein the process comprising using the polyol containing HCFC-22 in an amount of about 7 to 10% by weight on the basis of the total weight of the polyol and the HCFC-22, and the water in an amount of about 1 to 3% by weight on the basis of the weight of the polyol.

When the HCFC-22 is blended in an amount of 10% by weight or more on the basis of the total weight of the polyol and the HCFC-22, the problem is as follows:
a) When foamed, the evaporation loss of HCFC-22 increases,
b) The thermal insulating and mechanical properties impair due to the froth voids evolved,
c) An expensive investment costs may be additionally required to meet the provisions of the Japanese High Pressure Gas Control Law, because the saturated vapor pressure of the blend may exceed 2 $Kg/cm^2$ in the case.

In contrast, when HCFC-22 is blended in an amount of 7% by weight or less, it is necessary to increase the amount of $CO_2$ gas produced by the reaction between the isocyanate and water in order to maintain the expansion ratio. When the amount of $CO_2$ gas increases, the thermal insulating properties and dimensional stability of the polyurethane obtained impair because of the high thermal conductivity and high gas permeability of $CO_2$ gas.

Therefore, to maintain the preferred properties of the product such as expansion ratio, thermal insulating and mechanical properties, dimensional stability, and the like, the suitable amount of HCFC-22 to be blended with the polyol is in an amount within the range of about 7 to 10% by weight on the basis of the total weight of the polyol and the HCFC-22, and the suitable amount of water is within the range of about 1 to 3% by weight on the basis of the weight of the polyol.

Any conventional method may be employed to blend the HCFC-22 with polyol. Examples of the method include a continuous or batchwise mixing by pump or means of a capillary.

Each component measured in advance may be blended together.

It is preferred to carry out the mixing under the conditions wherein the HCFC-22 gas liquefies and the solubility of the HCFC-22 in polyol increases.

According to a fourth aspect of the invention, there is provided a process for the manufacture of the rigid foamed polyurethane wherein the process comprises using the isocyanate which contains a part of the HCFC-22 employed.

When a part of the HCFC-22 is blended in the isocyanate employed, the saturated vapor pressure of the gas phase of the blend is lowered. As a result, any expensive high-pressure equipment is not required, and latitude in selecting optimum conditions for the mixing of the HCFC-22, water, catalyst, and additives with polyol can be broaden preferably.

The amount of HCFC-22 to be blended with the isocyanate is a part of the HCFC-22 which is otherwise to be blended with the polyol, and preferably about 5 to 50% by weight of the HCFC-22 which is present in the polyol.

According to a fifth aspect of the invention, there is provided a process for the manufacture of the rigid foamed polyurethane in accordance with the third or fourth aspect of the invention, wherein the process comprises using a HCFC-22 blend which contains HCFC-142b in an amount of about 40 to 60 by weight, based on the total weight of HCFC-22 and HCFC-142b. Although HCFC-142b is flammable as described above, the foaming agent blend of HCFC-22 with HCFC-142b in a specific amount may still keep its nonflammability while the impairment in thermal conductivity of the product on standing being prevented.

Although any isocyanate may be employed, examples of the suitable isocyanate of the present invention include aromatic isocyanates, aliphatic isocyanates, diisocyanates, polyisocyanates, hydrogenated derivatives thereof, masked isocyanates, crude isocyanates contaminated by polyureas, pretreated and prepurified condensation products thereof, and the like.

Examples of the concrete isocyanate include: 2,4-tolylene diisocyanate, 65/35 tolylene diisocyanate, 80/20 tolylene diisocyanate, 4,4'-diphenylmethanediisocyanate, methaxylilene diisocyanate, polymethylene polyphenyl isocyanate, hydrogenated tolylene diisocyanate, hydrogenated diphenylmethane diisocyanate, trimer of tolylene diisocyanate, a copolymer of hydrogenated diphenylmethane diisocyanate with trimer of tolylene diisocyanate, and the like. These are available as commercial products.

Any polyol may be employed. Examples of the suitable polyols include: polyesters; polyether polyols such as poly (oxypropylene ether) polyols and poly (oxyethylene-propylene ether) polyols; acryl polyols; castor oil derivatives; tall oil derivatives; other hydroxy group-containing compounds; and the like. Examples of the concrete polyols include: polyesters prepared from a dimer acid and a glycol; polyesters prepared from adipic acid and phthalic acid triol; polyesters prepared from adipic acid, phthalic acid triol and a diol; diols such as polyoxypropylene glycols; poly (oxypropylene) poly (oxyethylene) glycols; polyoxybutylene glycols, polyoxytetramethylene glycols, poly (oxypropylene) triols; triols such as poly (oxypropylene) triols, poly (oxypropylene) poly (oxyethylene) triols, poly (oxypropylene) poly (oxyethylene) poly (oxypropylene) triols; sorbitol; pentaerythrithol; sucrose; starch; polyoxypropylene plyols; poly (oxypropylene) poly (oxyethylene) polyols, and the like.

The molecular weight, the molecular distribution, numbers of hydroxy group and unsaturated bond of the polyol may be determined in consideration of the particular reactivity of the polyol employed, properties of the rigid foamed polyurethane obtained, and the like.

Impurities such as alkaline substances or aldehydes included in an industrial-grade polyol may give an adverse effect for the reaction. Therefore, a polyurethane-grade polyol is used preferably, it being available as a commercial product.

Any process, instrument or equipment may be employed for the manufacture of the polyurethane of the invention by use of the isocyanate and polyol above-mentioned, water, CHFC-22 as foaming agent, a catalyst, and additives. The catalyst and additives are also available commercially.

In the manufacture of the rigid foamed polyurethane of the present invention, any batchwise or continuous foaming process to make structural-foaming products may be employed. One process involves an one-shot foaming process wherein an isocyanate, a polyol, water, HCFC-22, a catalyst, and additives are simultaneously mixed and reacted to foam, and the other process involves a prepolymer foaming process wherein a prepolymer having terminal isocyanate or hydroxy groups prepared by reacting an isocyanate with a polyol is reacted to foam in the presence of a catalyst and foaming agent. A low-pressure free foaming process or a high-pressure foaming process may also be employed. Further, a mechanical foaming process such as a froth process at ordinary or elevated temperature or an non-froth process may be employed.

However, it is preferred to blend in advance a specific amount of HCFC-22 with the polyol. In this case, it is possible to uniformly supply the specific amount of HCFC-22 by use of a predetermined amount of HCFC-22 dissolved in the polyol at a fixed pressure and temperature, resulting in a homogeneous foaming reaction whereby a rigid foamed polyurethane having a excellent cell uniformity without any voids may be obtained.

As to the mixing, it is preferred to carry out the mixing under conditions of low temperature and high pressure because the solubility of the HCFC-22 in a polyol increases with an increase in pressure and a decrease in temperature. However, when the temperature is too low, the viscosity of the blend becomes too high resulting in insufficient mixing. Further, when the pressure is too high, the plant costs may be too high and energy costs necessary for mixing will increase unpreferably.

The mixing temperature will be within the range of from 10° to 25° C., preferably from 15° to 20° C.

From the standpoint of the solubility, the mixing pressure will be preferably 10 Kg/cm$^2$ or higher, because HCFC-22 liquefies under pressure of 10 Kg/cm$_2$ or higher.

In the practice of the invention, the optimum mixing conditions may be determined in due consideration of these matters and the desired properties of the foamed product.

As described above, when a part of the HCFC-22, which is otherwise to be blended with the polyol, is incorporated into the isocyanate, the saturated vapor pressure of gas phase of the polyol blend containing HCF-22 lowers preferably.

Further, the use of the HCFC-22 blend containing a specific amount of HCFC-142b may preferably prevent the change in the thermal insulating properties of the product on standing. However, when HCFC-142b is blended in an amount more than the specific amount, the nonflammability of the HCFC-142b impairs unpreferably.

The properties of the foamed product such as density or thermal conductivity may be seriously affected by the amount of water employed. The suitable amount of water which is to be incorporated into the polyol will with within the range of from about 1 to 3% by weight on the basis of the weight of the polyol.

The cell size of the foamed product obtained may be also affected by the stirring velocity, mixing rate, mixing speed, back pressure of the mixing head, size of the orifice, the kind of impeller, the shape or structure of the mixing head. Therefore, optimum combinations of these matters should be determined depending on the desired proper ties of the product.

When the polyol is mixed with the low-boiling foaming agent, the following materials may be additionally incorporated depending on the purpose in using the product, in so far as they do not deviate from the gist of the present invention: an organic filler, an inorganic filler, an antioxidant, a lubricant, an organic or inorganic pigment, an ultraviolet inhibitor, a dispersant, a neutralizing agent, a plasticizer, a nucleating agent, and the like. Examples of the concrete dispersant include liquid paraffins and silicone oils. The inorganic filler may be used in granular, lamellar, scaly, needle, spherical, balloon and fibrous forms, and examples of the concrete inorganic fillers include granular fillers such as calcium sulfate, calcium carbonate, magnesium carbonate, calcium silicate, clay, diatomaceous earth, talc, alumina, siliceous sand, glass powder, iron oxides, metallic powder, $Sb_2O_3$, graphite, silicon carbide, silicon nitride, silica, boron nitride, aluminum nitride and carbon black; lamellar and scaly fillers such as mica, glass plate, sericite, pyrophyllite, metallic foils, for example, aluminum flake, and graphite; balloon fillers such as SHIRASU balloon, and pumice; and mineral fibers such as glass fiber, carbon fiber, graphite fiber, whisker, metallic fiber, silicon carbide fiber, asbestos and wollastonite.

The following Examples will further illustrate the invention, which by no means limit the invention.

In accordance with the following recipes, a rigid foamed polyurethane sample was prepared in a mold by means of a forming machine equipped with a large mixing head. The properties of the samples are given in Table 1.

TABLE 1

(Unit: Part by Weight)

|  | Example 1 | Example 2 | Example 3 | Comparative Example 1 |
|---|---|---|---|---|
| Component A | | | | |
| Polyol | 100 | 100 | 100 | 100 |
| *Foaming agent* | | | | |
| HCFC-22 | 10 | 6 | 7 | — |
| HCFC-142b | — | 4 | — | — |
| CFC-11 | — | — | — | 16 |
| Catalyst | 0.64 | 0.64 | 0.64 | 0.64 |
| Silicone dispersant | 0.64 | 0.64 | 0.64 | 0.64 |
| Water | 1 | 1 | 1 | 1 |
| Component B | | | | |
| Isocyanate | 140 | 140 | 140 | 140 |
| HCFC-22 | — | — | 3 | — |
| Properties of Rigid Foamed Polyurethane | | | | |
| Density (Kg/m$^3$) | 34 | 34 | 34 | 34 |
| Closed cell (%) | 95 | 95 | 95 | 95 |
| Compressive strength (Kg/cm$^2$) | 2.4 | 2.4 | 2.4 | 2.4 |
| *Dimensional stability* | | | | |
| −30° C.* 48 hrs. (vol. %) | +0 | +0 | +0 | +0 |
| +70° C.* 48 hrs. (vol. %) | +10 | +5 | +10 | +5 |
| *Thermal conductivity (K cal/mh., °C.) Temperature Gradient* | | | | |
| (1): from +37.7 to +10 | 0.017 | 0.017 | 0.017 | 0.016 |
| (2): from +15 to −15 followed by (1) | 0.016 | 0.016 | 0.016 | 0.017 |
| (3): from +37.5 to +10 followed by (2) after 5 weeks on standing at 70° C. | 0.024 | 0.021 | 0.024 | 0.020 |
| Change in thermal conductivity (%) of the samples tested | +41 | +24 | +41 | +25 |
| Flammability | self | self | self | self | self: self extinguish

Examples 1 to 3 give the blending proportions of the raw materials employed and the results which measure the properties of the resultant rigid foamed polyethylenes.

Example 2 gives the effect of using HCFC-142b as the foaming agent in place of a part of HCFC-22, resulting in a rigid foam having the same properties as in Example 1 but a less change in the thermal conductivity on standing while retaining its nonflammability.

Example 3 gives the effect of using an isocyanate which contains a part of HCFC-22 which should be otherwise incorporated into the polyol. The results indicate that a rigid may be prepared in the same way as in Examples 1 and 2, with the same properties of the foam obtained in Example 1. In this case, the vapor pressure in the gas phase inside the mixing vessel dropped by about 0.5 KG/cm$^2$, resulting in allowing additional latitude for selecting the compounding conditions.

As evidenced by the above Examples, it should be apparent that the present invention provides a rigid foamed polyurethane and a process for the manufacture of the polyurethane wherein the polyurethane is made up substantially of closed cells which contain at least a foaming agent designated by HCFC-22 and $CO_2$ gas therein. The foamed polyurethane can be obtained by using HCFC-22 or a blend of the HCFC-22 with HCFC-142b as foaming agent which has a short life in the atmosphere because of having hydrogen atoms in their molecules. Thus, according to the present invention, it is possible to avoid the use of conventional foaming agents which are suspected of being substances eating a hole in the atmosphere's layer of ozone and consequently linking to global warming.

The rigid foamed polyethylenes of the present invention, which contain a foaming agent designated by HCFC-22 having a boiling point of −40.8° C. in their closed cells, can retain their good thermal insulating properties over a temperature of from about −30° to −40° C., and can be used for most applications in the extremely cold conditions.

Further, when employing a HCFC-22 blend containing a specific amount of HCFC-142b as foaming agent, there is provided a rigid foamed polyurethane having a less change in thermal insulating properties on standing while retaining good flame resistance of the rigid foam.

What is claimed is:

1. A rigid foamed polyurethane of closed cells containing a foaming agent designated by HCFC-22 and $CO_2$ gas therein, wherein the cells further contain a foaming agent designated by HCFC-142b in an amount of about 40 to 60% by weight, based on the total weight of the HCFC-22 and HCFC-142B.

2. A process for the manufacture of a rigid foamed polyurethane by use of at least an isocyanate, a polyol, water and a foaming agent designated by HCFC-22, by process comprising using the polyol containing the HCFC-22 in an amount of about 7 to 10% by weight on the basis of the total weight of the polyol and the HCFC-22, and the water in an amount of about 1 to 3% by weight on the basis of the weight of the polyol.

3. A process as claimed in claim 2, further comprising blending a part of the HCFC-22 with the isocyanate.

4. A process as claimed in claim 2, further comprising blending a foaming agent designated by HCFC-142b in an amount of about 40 to 60% by weight with the HCFC-22, on the basis of the total weight of HCFC-22 and HCFC-142b.

5. A process as claimed in claim 3, further comprising blending a foaming agent designated by HCFC-142b in an amount of about 40 to 60% by weight with the HCFC-22, on the basis of the total weight of HCFC-22 and HCFC-142b.

* * * * *